United States Patent Office 3,284,850
Patented Nov. 15, 1966

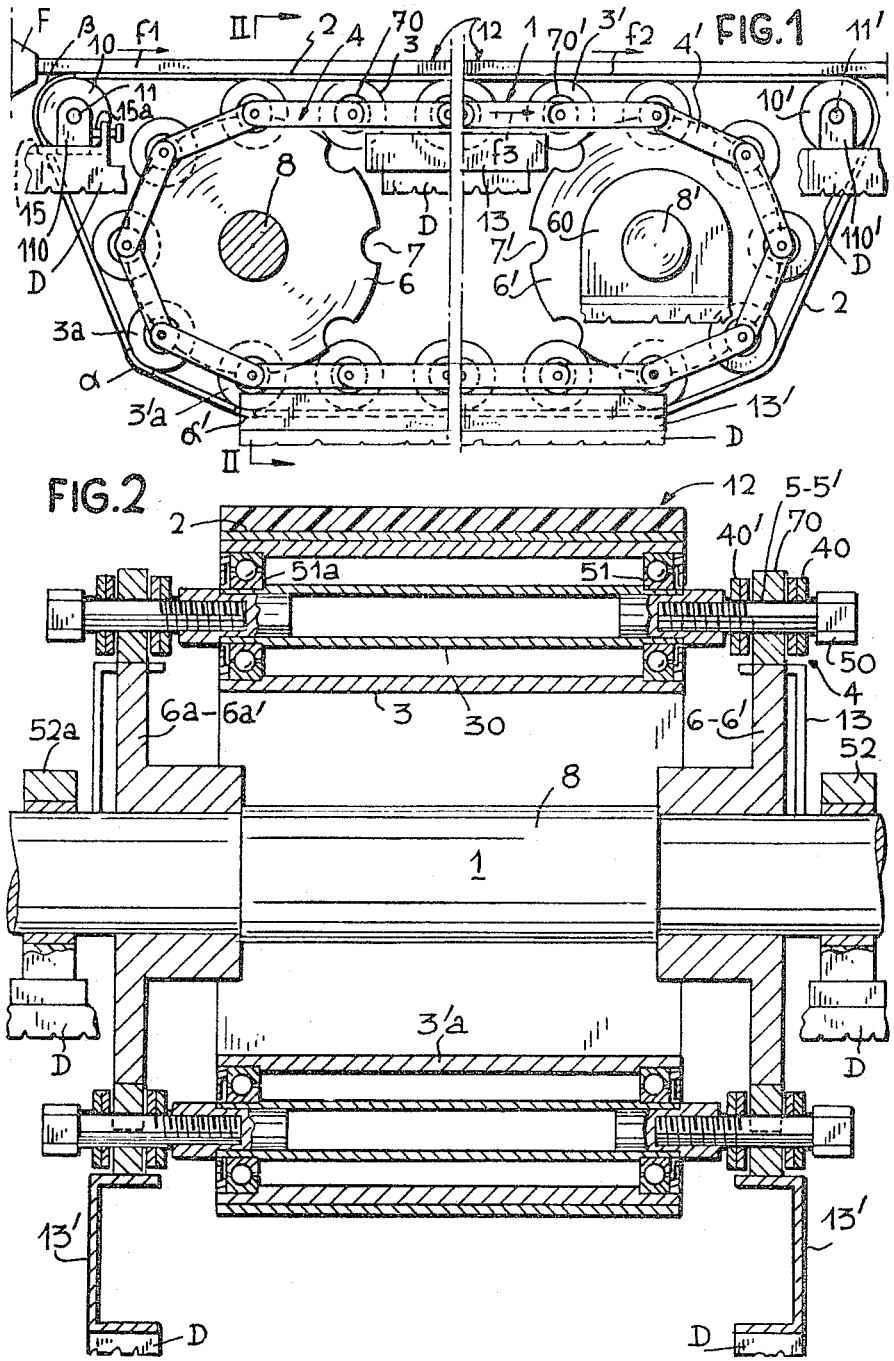

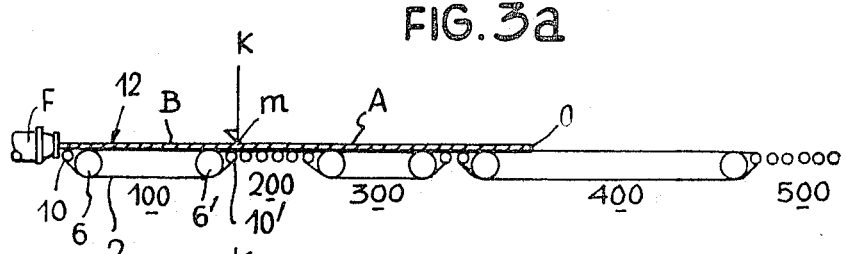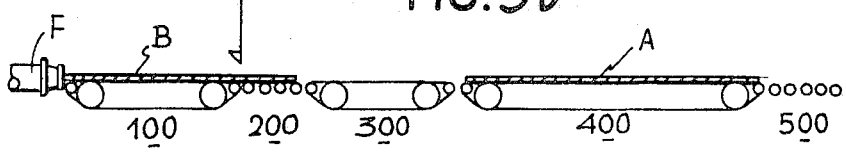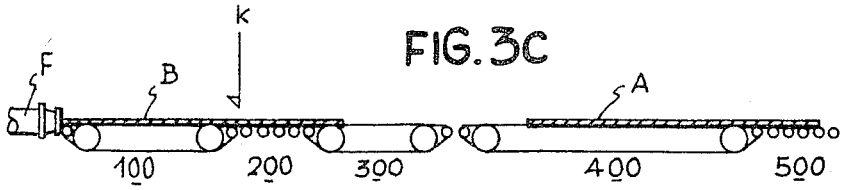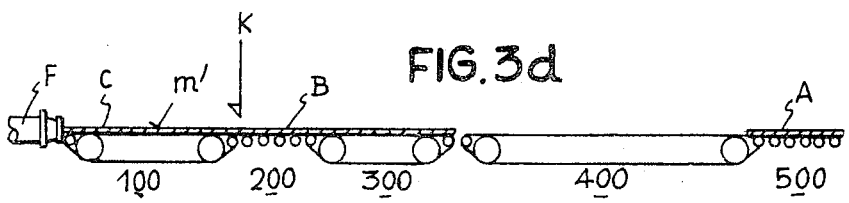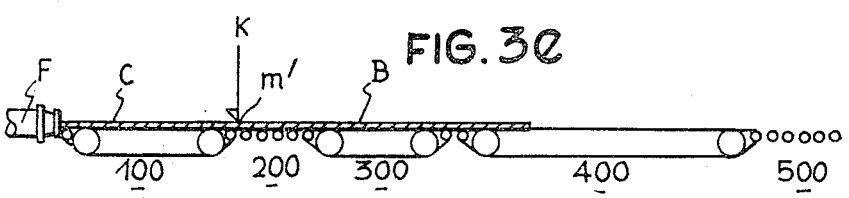

3,284,850
CONVEYING DEVICE
Maurice Joseph Ghislain Verly, Mol, Belgium, assignor to Johns-Manville Corporation, Societe Anonyme, Mol, Belgium
Filed Feb. 11, 1964, Ser. No. 344,091
Claims priority, application Belgium, Feb. 15, 1963, 628,490; Nov. 26, 1963, 640,430
11 Claims. (Cl. 18—12)

The present invention relates to a conveying device for removing material at the exit of continuous processing apparatus, more particularly at the exit of extruding presses and also concerns a plant comprising such devices.

Conveyors of various types comprising different combinations of bands, chains, and rolls are known. However, as far as applicant is aware, the known conveyors are not able to solve simultaneously and by simple means certain delicate problems which arise for example at the exit of extruders or similar production apparatus. One of these problems consists in matching exactly, at any time, the speed at which the extrudate is taken off with the extrusion speed. Another problem consists in correcting automatically the changes of the output of the extruder. Still another problem consists in controlling the pull exerted on the extrudate at the exit of the extruder.

All these problems are solved by the device according to this invention. This device comprises a conveying band onto which the load or extrudate is discharged and free rotating rolls supporting said band, some of these rolls being driven in a translation movement by motor means. According to this invention, the conveying band is permanently in contact with said driven rolls and is driven by these rolls under the influence of the load received by the conveying band.

The invention also relates to a plant comprising at least one extrusion die or any equivalent production unit, followed by a conveying system comprising several conveyors, at least one of them being of the above described type, the arrangement being such that its is possible to severe into successive lengths a web of continuously produced extrudate and to remove the secured lengths without impairing the production.

Other features of the invention will appear in the following description of an embodiment of the invention so as to permit a complete understanding of the invention.

In the drawings:

FIGURE 1 is a diagrammatic side elevation, partially in section, with parts broken and central part removed, of a conveying device according to the invention.

FIGURE 2 is a section along lines II—II of FIGURE 1.

FIGURES 3a, 3b, 3c, 3d and 3e are successive purely schematical views of a plant according to this invention.

Referring to FIGURES 1 and 2, the apparatus comprises essentially a conveyor 1 consisting of rolls and chains and a conveying band 2 surrounding conveyor 1. Conveyor 1 is driven by a motor diagrammatically shown by the block 60. The belt 2 which receives the load or extrudate 12 bears permanently upon the rolls 3, 3' . . . of the chain conveyor and is driven only by said rolls. The chain conveyor comprises two pairs of sprocket wheels 6, 6a and 6', 6'a, carried by shafts 8, 8', shaft 8' being driven by the motor 60. Shafts 8, 8' are journalled in bearings as indicated by 52, 52a, fixed on frame D of the apparatus, only the main parts of which being illustrated. Since the chains and appended parts are identical on both sides of the apparatus, it will be sufficient to describe only chain 4 which appears on FIGURE 1. Chain 4 includes actually two parallel chains 40 and 40' spaced by bushings such as 5, 5'. Rollers such as 70, 70' are rotatively mounted on said bushings and are received in notches 7, 7' of sprocket wheels 6, 6'. The links of the chains are hingedly connected by bolts 50 passing through said bushings and through the ends of adajcent links, said bolts being threaded in the ends of shafts 30. Ball bearings such as 51 and 51a are mounted on each shaft 30. Rollers such as 3, 3', 3a, 3'a etc. freely rotate on said ball bearings. In the space between sprocket wheels 6 and 6', rollers 70, 70' are supported by tracks such as track 13 for the upper run, and such as track 13' for the lower run of the endless chains. These tracks are fixed on frame D.

Endless belt 2 passes over the rolls of the upper and lower runs of the chains and over two end rolls such as 10 and 10' supporting the ends of the upper run. Rolls 10 and 10' freely rotate about shafts 11 and 11' journalled in bearings 110, 110'. Bearing 110' is fixedly mounted on frame D, whereas bearing 110 may slide in a groove 15 of frame D. A screw 15a extending through a threaded bore of a part of frame D bears against bearing 110 and permits shaft 11 of roll 10 to be adjustably spaced from shaft 11', so that belt 2 may be tensioned as desired. As shown on FIGURE 1, belt 2 engages end rolls 3a, 3'a of the lower run of the chains along arcs α and α', respectively.

Operation

In order to understand the operation of the apparatus, the case where belt 2 does not carry any load and the case where this belt is loaded will be discussed successively. In both cases, the chains are driven by motor 60 at a speed $V_3$ directed along arrow $f_3$. Speed $V_3$ is chosen so as to be rather high, for example about 10% higher than the extrusion speed $V_1$.

When belt 2 is not loaded, it rests on rolls 3, 3' . . . under the action of its own weight. If the bearings of said rolls develop a normal friction resistance, and if belt 2 is only slightly tensioned, it is observed that belt 2 is driven along arrow $f_2$ at a speed $V_2$ which may be lower than or equal to $V_3$. Speed $V_2$ depends on the amount of passive resistances of the whole assembly (i.e. of the frictional forces in the bearings and on the stiffness of the belt), and on the tension of the belt. Passive resistances in the bearings of the rolls carried along with the chains tend to help belt 2 being driven in the direction of arrow $f_2$. Tension of belt 2 acts in an opposite sense, i.e. when said tension is increased, the speed of the belt becomes lower than the speed of the chains. This can be understood by considering what happens at roll 10 and at rolls 3a, 3'a. The belt 2 engages roll 10 along a large arc β. The resultant of the tension forces in the parts of the belt on both sides of roll 10, which corresponds to the pressure acting on bearing of roll 10, is rather large. Thus, the resistance offered by roll 10 to running of belt 2 over it is high, so that belt 2 tends to be slowed down. On the contrary, the belt 2 engages roll 3a along a comparatively small arc α. Consequently, a certain pressure will of course be exerted on the bearings of roll 3a. These forces tend to interlock belt 2, roll 3a and chain 4 so that roll 3a tends to drive the belt with the chain in translation. The same is true for roll 3'a. But since the total arc engaged by the belt on rolls 3a, 3'a is smaller than the arc engaged on roll 10, action of roll 10 is more effective than that of rolls 3a and 3'a. Consequently, increasing tension of the belt results in causing speed $V_2$ of the belt to become lower than speed $V_3$ of the chains.

It is now assumed that belt 2 is loaded by extrudate, the preceding conditions remaining unchanged. Extrudate arrives on the belt at speed $V_1$ which is lower than speed $V_3$, in the direction of arrow $f_1$. If the friction developed between the extruded material and the belt is sufficient, there will be no slippage between said material and the belt, and the material will tend to impose its own speed $V_1$ to the belt. In other words, speed of the unloaded belt, which has $V_2$, slightly lower than $V_3$ or even equal to $V_3$, tends to decrease until to reach value of $V_1$, which is substantially lower than $V_2$ and consequently lower than $V_3$. This may only be possible if the above considered passive resistances are not too high and if the tension of the belt is sufficient. If passive resistances remain lower than a limit value, and if the tension remains higher than another limit value, these limit values depending on the friction coefficient of the extruded material on the belt, said belt will actually follow the extrusion speed $V_1$ and will automatically match itself with the changes of said extrusion speed. If said limit values are passed through, the speed of belt will approach the speed $V_3$ of the chains in the same manner as when belt 2 is not loaded, whereas the material driven by belt 2 will tend to exert a pull action on the part of the extruded material extending between die F and the belt, and to tear the extrudate in this region.

It is not very easy to act on the passive resistances, but it is on the contrary very easy to control the tension of belt 2 by any conventional means, for example by screw 15a. Tension of belt 2 will be adjusted to such an extent that, while the speed of the belt is allowed to remain equal at any time to the extruding speed $V_1$, the tension of the belt will be brought to a value (lower than the above mentioned limit) sufficiently near to said limit for the extrudate being only subjected to a slight pull in the region comprised between the extruding die and the belt, without exceeding the yield point of said material. The control of said pull allows the axis of the extrudate to be always maintained rectilinear, this being very important when products of a great length are to be extruded from a plastic settable material.

Should $V_3$ be chosen so as to be lower than extrusion speed $V_1$, the loaded belt would move slower than the material issuing from the extruding die, so that some compression strains would be created in the extruded material in the region comprised between the extruding die and the belt, such compression strains being very detrimental for the quality of the extrudate and having obviously to be avoided.

Should the extrudate be sufficiently fluid, the apparatus according to the invention permits to automatically adjust the thickness of the layer of material deposited onto the belt and carried along with it. The load on the belt varies as a function of speed $V_1$ of the material at the exit of the die F or, since the cross section of said die remains unchanged, this load is a function of the output of the die. Assuming that the output of the die F increases, the thickness of the layer of material deposited onto the belt will tend to increase and so will do the load onto the belt. Consequently, pressure forces in the bearings of the rolls supporting the upper run of the belt will increase, the frictional forces in these bearings will also increase, and speed $V_2$ of the belt will tend to increase and approach the speed $V_3$ of the chains. The layer of material carried along with the belt will then become thinner so as to compensate the changes of the die output, favorably for maintaining constant the thickness of the material deposited on the belt. If, on the contrary, the output of the die decreases, the load on the belt and consequently the friction in the bearings of the rolls also decreases; speed $V_2$ will then tend to decrease and the thickness of the layer deposited on the belt will increase, so that a compensation similar to the above described one, but in the opposite sense, will occur. Thus, the device allows not only to match the conveying speed of the extrudate with the extrusion speed, but also to correct or to compensate changes in the output of the extruder.

When several devices of this type follow one another, as in the plant to be described hereinafter, it may be convenient to increase the speed of some of them. This greater speed may be produced in several manners, either by controlling the rotation of a roller such as 10, or in other manners known per se and which will not be described since they do not form part of the invention.

A plant for cutting a band of continuously produced material and discharging the length so cut, without interfering with the production of said material, will now be described.

In FIGURES 3a to 3e, each of which represents the plant as a whole, the conveyors 100, 300 and 400 are all of the type shown or illustrated in FIGURE 1. For sake of simplicity, reference numerals relating to belt 2, wheel 6 and corresponding wheel 6', wheel 10 and corresponding wheel 10' of only the first one of these devices are given. The elements of the apparatus, including chains 4 and rolls 3, 3' . . . carried by the same, are not illustrated for sake of clarity.

The devices 200 and 500 are carrying devices comprising self contained rolls capable of rotating freely on their axes and disposed in relatively parallel and successive relation to each other. All conveying and carrying devices which make up the whole apparatus are disposed in alignment with each other and at the same level, following extruding die F which produces material 12 in a continuous process.

In the area of carrying device 200 immediately following first conveying device 1, opposite a point of the band of material 12 which is indicated by letter $m$ in FIGURE 3a and by $m'$ in FIGURE 3b, is mounted a cutting device schematically indicated by the cutter K, which device allows the extruded material to be separated into lengths A and B (FIGURE 3a). Conveyors 300 and 400 are provided with any convenient means (not shown)—for example motors driving the rolls such as 10 or 10' supporting the belts of said conveyors, said means allowing to impart the belts of these apparatus a greater speed than that of corresponding belt of conveying device 100. Provisions are also made in order that the translation speeds of the conveying belts of apparatus 300 and 400 may be adjusted independently of each other.

The operation of the plant can be understood by considering FIGURES 3a to 3e which illustrate the successive steps of a process comprising in combination extruding a band of material, cutting said material into lengths and removing said lengths.

Die F initially produces a band of material 12 which advances on the elements 100, 200, 300 and 400 of the plant. Conveyors 100, 200, 300 and 400 have the same speed which suits the changing extrusion speed, while allowing a slight drawing from the conveyors on the material. This drawing resulting from the passive forces avoids warping of band 12 and may be adjusted as indicated above.

When the continuous material band 12 reaches such a point that between its head or front edge $o$ and point $m$ under the cutting device K of a length of material extends which is equal to the length which is intended to be given to piece A, cutting device K is actuated for severing material length A from material length B yet being extruded. As soon as this severing is completed, the advance of conveyors 300 and 400 is accelerated while causing them to have the same speed, so as to carry length A quickly away on carrying rollers 500, from which length A is removed, while taking all the necessary time for this operation and without having to take care of the extrusion process which is continued at the front end of the plant, as shown in FIGURES 3b, 3c and 3d. At the beginning of this step of conveying and removing length A, when this length leaves conveyor 300, one stops acting on the speed of the latter (while conveyor 400 maintains its great speed) so as to allow conveyor 300 to take again a speed suitably related with the speed of extrusion (FIGURE 3e). In FIGURE 3d, the extrudate is seen to have advanced and the front or head of the material is nearly reaching conveyor 400, while point m' indicating the end of what will be called length B is yet on conveyor 100. The high speed driving of conveyor 400 must then be stopped, in order that the speed of the conveyor 400 may at its turn match with the advancing speed of the band of material 12 which is leaving die F of the extruding press.

FIGURE 3e shows the condition when point m' reaches cutting device K. At this moment, the conditions are exactly the same as in FIGURE 3a, except that length B has taken the place of length A and that next coming length C appears as did length B of material in FIGURE 3a. The cycle of operations may then be repeated.

I claim:

1. Apparatus for conveying material comprising:
   (a) a first conveyor comprising a plurality of freely rotatable rollers,
   (b) means for driving said conveyor in a predetermined direction,
   (c) a second conveyor in contact with at least some of said plurality of rollers,
   (d) means for applying a force to said second conveyor to move said second conveyor in the same direction as said first conveyor, and
   (e) means for regulating the amount of said force acting on said second conveyor.

2. Apparatus as defined in claim 1 wherein said means for applying a force comprises:
   (a) the resistance to rotation of said some of said plurality of rollers.

3. Apparatus for conveying material comprising:
   (a) an endless conveyor comprising a plurality of spaced freely rotatable rollers,
   (b) means for driving said conveyor in a predetermined direction,
   (c) an endless belt trained around said conveyor and in contact with at least some of said plurality of rollers,
   (d) said contacting relationship between said belt and at least some of said plurality of rollers developing a force acting on said belt to drive it in the same direction as said conveyor, and
   (e) means for regulating the amount of said force acting on said belt.

4. Apparatus for conveying material comprising:
   (a) an endless conveyor comprising a plurality of spaced freely rotatable rollers,
   (b) means for driving said conveyor in a predetermined direction,
   (c) an endless belt trained around said conveyor and in contact with at least some of said plurality of rollers,
   (d) said contacting relationship between said belt and at least some of said plurality of rollers developing a force acting on said belt to drive it in the same direction as said conveyor,
   (e) said force developed through said contacting relationship comprising the resistance to rotation of said some of said plurality of said rollers, and
   (f) means for providing an additional force acting on said belt so that the summation of said forces acting on said belt is less than the amount of said force developed through said contacting relationship.

5. Apparatus for conveying material comprising:
   (a) an endless conveyor comprising a plurality of spaced freely rotatable rollers,
   (b) means for driving said conveyor in a predetermined direction,
   (c) an endess belt trained around said conveyor and in contact with at least some of said plurality of rollers,
   (d) said contacting relationship between said belt and at least some of said plurality of rollers developing a force acting on said belt to drive it in the same direction as said conveyor,
   (e) said force developed through said contacting relationship comprising the resistance to rotation of said some of said plurality of said rollers,
   (f) means for applying a tension in said belt, and
   (g) said tension applying means generating a force acting on said belt so that the summation of said forces acting on said belt is less than the amount of said force developed through said contacting relationship.

6. Apparatus as defined in claim 5 wherein said tension applying means comprises:
   (a) a pair of freely rotatable rolls over which said belt is trained.

7. Apparatus as defined in claim 6 and further comprising:
   (a) means to adjust the position of at least one of said freely rotatable tension applying rolls to varying the tension in said belt.

8. Apparatus for conveying material comprising:
   (a) an endless conveyor comprising a plurality of spaced freely rotatable rollers,
   (b) means for driving said conveyor in a predetermined direction,
   (c) an endless belt trained around said conveyor and in contact with at least some of said plurality of rollers,
   (d) said contacting relationship between said belt and at least some of said plurality of rollers developing a force acting on said belt to drive it in the same direction as said conveyor,
   (e) said force developed through said contacting relationship comprising the resistance to rotation of said some of said plurality of said rollers,
   (f) means for depositing a material on said belt so as to increase the force developed by the resistance to rotation of said some of said plurality of rollers, and
   (g) means for providing an additional force acting on said belt so that the summation of said forces acting on said belt is less than the amount of said force developed through said contacting relationship.

9. Apparatus for conveying material comprising:
   (a) an endless conveyor comprising a plurality of spaced freely rotatable rollers,
   (b) means for driving said conveyor in a predetermined direction,
   (c) an endless belt trained around said conveyor and in contact with at least some of said plurality of rollers,
   (d) said contacting relationship between said belt and at least some of said plurality of rollers developing a force acting on said belt to drive it in the same direction as said conveyor,
   (e) said force developed through said contacting relationship comprising the resistance to rotation of said some of said plurality of said rollers,
   (f) means for depositing a material on said belt so as to increase the force developed by the resistance to rotation of said some of said plurality of rollers,
   (g) means for moving said material so that it is deposited on said belt at a predetermined speed, and
   (h) means for controlling the relative speeds of said conveyor and said speed of said material in relation to the summation of said forces so that a substantially constant force is exerted on said material as it is deposited on said second conveyor.

10. Apparatus as defined in claim 9 wherein:
   (a) said material comprises a plastic material having a relatively low yield point to tearing when subjected to pulling forces.

11. Apparatus for conveying material comprising:
   (a) an endless conveyor comprising a plurality of spaced freely rotatable rollers, (b) means for driving said conveyor in a predetermined direction,
(c) an endless belt trained around said conveyor and in contact with at least some of said plurality of rollers,
(d) said contacting relationship between said belt and at least some of said plurality of rollers developing a force acting on said belt to drive it in the same direction as said conveyor,
(e) said force developed through said contacting relationship comprising the resistance to rotation of said some of said plurality of said rollers,
(f) an extruder for depositing an extrudate on said belt so as to increase the force developed by the resistance to rotation of said some of said plurality of rollers,
(g) said extrudate comprising a plastic material having a relatively low yield point to tearing when subjected to pulling forces,
(h) means for moving said material so that it is deposited on said belt at a predetermined speed, and
(i) means for controlling the relative speeds of said conveyor and said speed of said material in relation to the summation of said forces so that a substantially constant force is exerted on said material as it is deposited on said second conveyor.

References Cited by the Examiner

UNITED STATES PATENTS

| | | | |
|---|---|---|---|
| 1,279,579 | 9/1918 | Perkins | 198—203 |
| 1,594,845 | 8/1926 | Myers | 18—21 X |
| 1,792,316 | 2/1931 | Leguillon | 18—2 |
| 1,808,525 | 6/1931 | Cadden | 18—2 |
| 2,051,781 | 8/1936 | Brown | 18—21 |
| 2,075,735 | 3/1937 | Loomis | 18—6 X |
| 2,156,895 | 5/1939 | Godot | 18—2 |
| 2,292,366 | 8/1942 | De Wyk | 18—4 |
| 2,682,334 | 6/1954 | Thompson et al. | 198—203 |

WILLIAM J. STEPHENSON, *Primary Examiner.*

WILLIAM B. LA BORDE, *Examiner.*